United States Patent [19]
Jones

[11] 3,914,459
[45] Oct. 21, 1975

[54] METHOD OF MAKING A RESTRUCTURED MEAT PRODUCT

[75] Inventor: Norman Jones, Great Yarmouth, England

[73] Assignee: Lever Brothers Company, New York, N.Y.

[22] Filed: Jan. 25, 1974

[21] Appl. No.: 436,752

[30] Foreign Application Priority Data
Jan. 31, 1973 United Kingdom............... 4838/73

[52] U.S. Cl. ................. 426/645; 426/76; 426/274; 426/646
[51] Int. Cl.² .......................................... A23L 1/31
[58] Field of Search.................... 426/274, 388, 76

[56] References Cited
UNITED STATES PATENTS
3,163,541  12/1964  Mainhardt et al. ................ 426/274
3,793,466  2/1974  Hawkins et al. .................... 426/274

OTHER PUBLICATIONS
"Webster's New Collegiate Dictionary," 1956, Published by C. & C. Merriam Co., Springfield, Mass., p. 778, Article Entitled SHEAR.

Primary Examiner—Hyman Lord
Attorney, Agent, or Firm—James J. Farrell, Esq.

[57] ABSTRACT

A restructured meat product in the form of small pieces is made from a comminute of raw meat by incorporating in the comminute fibres of set protein, extruding the fibrous comminute thus obtained through a plurality of holes while transversely shearing the comminute at the entrances to the holes, heat setting the resulting coherent strings of extrudate, and then mechanically working the heat-set strings to break them at points of weakness and form small pieces such as sticks or granules.

4 Claims, 5 Drawing Figures

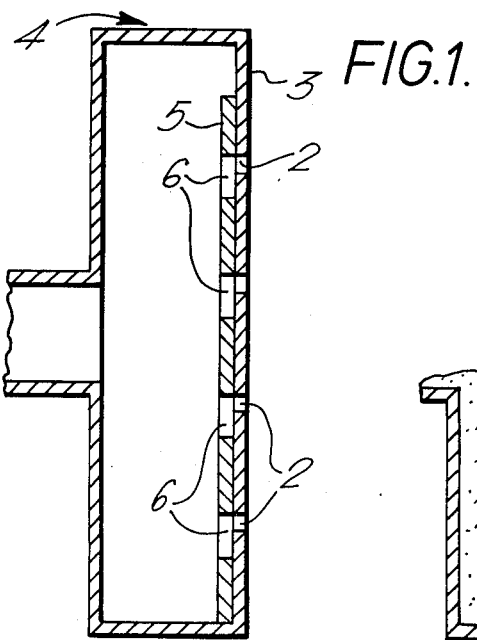
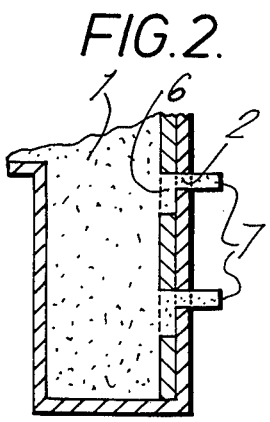
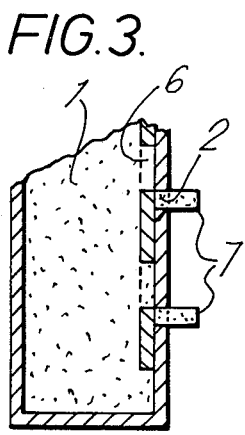
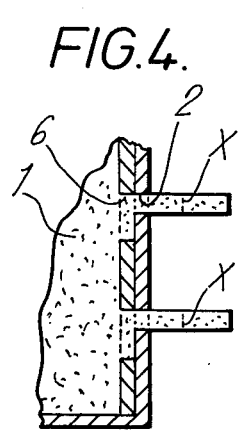
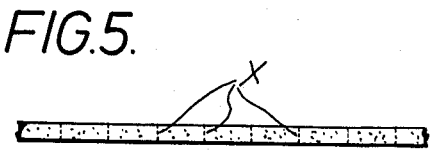

METHOD OF MAKING A RESTRUCTURED MEAT PRODUCT

This invention relates to restructured meat products, more particularly to such products in the form of relatively small pieces (as distinct from, say, steaks) suitable, for example, for incorporation in meat pies.

Much of the musculature of a meat carcass is, though nutritionally good, associated with so much tough connective tissue that it makes poor eating. If the natural structure producing this unsatisfactory eating texture is destroyed by finely comminuting the meat with conventional equipment such as a colloid mill, hammer mill or bowl chopper, the comminute produced can be restructured into products which on cooking are much more palatable and tender than the original meat is when cooked. Thus, after the inclusion in the comminute of such additional fibrous material as may be needed in order to generate a desirably chewy meat-like texture in the eventual product, the comminute can be extruded as a sheet, which can then be heat set, and cut into dice or other small pieces. However, forming such pieces by a cutting operations carried out on heat set material is not always convenient.

The present invention provides an improved method of making restructured meat products in the form of small pieces.

The method of the invention depends on our discovery that when a raw meat comminute containing fibres of set protein is extruded through holes while being transversely sheared (i.e. sheared in a direction transverse to the direction of flow) at the entrance to the extrusion holes, so that the successive elements of meat comminute extrudate formed by shearing and extrusion at each hole reunite to form a coherent string of extrudate, then the string so formed has, regularly spaced along its length, points (or more strictly, planes) of weakness corresponding to the points of reunification of the successive elements. And we have found that, if the coherent strings thus formed are heat set in order to prevent them from adhering to one another during subsequent mechanical working, and the heat set strings are then mechanically worked, they break at the points of weakness and form smaller pieces. The method of the invention is particularly suited to the production of products in the form of sticks or granules.

The invention will now be further described with reference to FIGS. 1–5 of the accompanying drawings.

The formation and reunification at each extrusion hole of the successive elements of meat comminute extrudate are diagrammatically illustrated in FIGS. 1 – 5 of the accompanying drawings, which show the extrusion of meat comminute 1 through the holes 2 in the face 3 of an elongated extruder head 4 within which is longitudinally reciprocable a cutter 5 having apertures 6. Extrudate 7 formed when the apertures 6 and the holes 2 are in register (FIGS. 1 and 2) is severed into elements when the cutter slides to the position in FIG. 3; and when the cutter slides back (FIG. 4) the element of extrudate at each hole is pushed onwards by and is reunited with further comminute issuing through registering apertures 6 and holes 2. The elements of extrudate thus successively formed at each hole produce a string (FIG. 5) which is coherent but has points of weakness (indicated by X), which correspond to the points of reunification and are no doubt due to the absence of any fibre bridging the adjacent reunited elements. When heat set and subjected to mechanical working, these strings break at the points of weakness X.

The dimensions of the product will depend on the cross-sectional area of the extrusion holes, and (as to length) on the various factors determining the distance between the points of weakness in the strings; for example, frequency of shear, and linear rate of flow through the extrusion holes. To form sticks or granules, the cross-sectional area of the holes is preferably from 5 to 50 mm$^2$; a particularly preferred range is 10 – 20mm$^2$. The other variable factors can by simple experiment be related to one another so as to yield points of weakness separated by any desired distance. To produce granules, the strings are formed with points of weakness that are fairly close, corresponding to the desired granule length, which is preferably 2 – 10mm. Sticks may be produced from strings formed with points of weakness more widely spaced e.g. 2–8cm, conveniently 2.5cm, or by controlling mechanical working of heat-set strings with more closely spaced points of weakness so that breakage does not occur at all the points of weakness.

The cross-sectional shape of the holes through which the comminute is extruded will of course determine the cross-sectional shape of the product, and this shape may for example be round, oval, square or oblong.

Transverse shearing of the comminute at the entrance to the holes can be brought about by a rotary cutter or a reciprocating one. A rotary cutter is more conveniently employed if extrusion of the meat comminute is carried out downwardly, while it is more convenient to employ a reciprocating cutter if the comminute is extruded horizontally.

The fibre present in the comminute need not be (though it preferably is) that of the type of meat subjected to comminution, and need not be of meat at all, though it must be of set protein. Thus, a suitable comminute of meat can be made by first submitting meat to a bowl chopper with the blade/bowl clearance set very fine, so that the inherent fibrous structure of the meat is practically completely destroyed, and then giving the resulting comminute a suitable fibrosity by including in it, in an amount forming up to 50% and preferably 5–40% of the total weight of comminute to be extruded, the fibre of cooked meat or spun protein fibres, for example fibres of acid-coagulated soy protein or of the heat coagulated soy or groundnut protein compositions described in our British Pat. 1,265,661.

The coherent strings of meat comminute emerge from the holes generally parallel to one another, and are then heat set in order to prevent them from adhering to one another when subjected to mechanical working in the eventual stage of subdivision into sticks, granules, dice or the like. Heating is preferably such that the strings attain a centre temperature of at least 80°C. Heating can be carried out by direct exposure of the strings to steam or hot air (for example, humidified air at a temperature in the range 80°–150°C, particularly 90°–100°C), by the use of microwaves or other heating radiation, or by other suitable means. If desired the strings can be heat set while conveyed on a belt extending from the extruder to the apparatus in which they are to be fragmented by mechanical working.

Mechanical working to break the heat-set strings to form sticks, granules or the like can be carried out in one stage or several. Conveniently, the heat-set strings are first roughly broken into lengths that can be easily accommodated in the container of the fragmenting apparatus employed, for example a Hobart planetary mixer, and these are then broken in the same apparatus to pieces of the desired length.

To improve the yield of product, it is preferable to include in the fibrous meat comminute submitted to extrusion a small proportion (not more than 5% by weight) of a water-binding material, particularly a salt such as sodium chloride or an alkali metal polyphosphate.

The invention is further illustrated by the following Example, in which reference to 'parts' means parts by weight.

EXAMPLE (*i*) Frozen boneless forequarter of beef was minced through a plate having holes or diameter 8 mm, and the comminute formed was mixed (59 parts) with cooked beef fibres (30 parts), water-binding salts (sodium chloride 1.5 parts and sodium triphosphate 0.5 parts;) and water (9 parts).

The cooked beef fibre ingredient was obtained by cooking cubes (of 4 cm side) of bonelsss topside of beef at 120°C for 1 hour, and teasing the cooked material for 15 seconds in a bowl chopper with its blade/wall gap set fairly wide (4 mm). The fibres thus formed were predominantly of length from 3–10 mm.

(*ii*) The fibrous comminute was extruded horizontally at about 3 meters per minute through an extrusion head having about 80 holes of diameter 4 mm (cross-sectional area 12.5 mm$^2$) while being sheared at a rate such as to obtain in the extruded strings points of weakness separated by about 4mm. The strings thus formed were deposited on a conveyor to form a pile about 3 cm high, and were carried through a tunnel through which humidified air at 90°–100°C was circulated.

(*iii*) The heat-set strings, some of which were lightly stuck to one another forming bundles, were cooled to about 4°C and roughly broken into lengths of about 25 cm.

These were broken in a paddle mixer of a conventional kind (Hobart) to form discrete sticks of length 2 – 8 cm.

By prolonging the action of the paddle mixer, these sticks were broken into granules of length 4 mm.

Both the sticks and the granules produced by the method of the Example are suitable for use in pies, but they can also be used for other purposes; thus they can be dried for use as an ingredient of dehydrated soup mixes.

What is claimed is:

1. A method of making a restructured meat product in the form of small pieces from a comminute of raw meat, comprising:
    *i*. incorporating in the raw meat comminute fibres of set protein in an amount forming from about 5 to about 50% by weight of the comminute;
    *ii*. extruding the comminute thus obtained through a plurality of holes while transversely shearing said comminute at the entrance to said holes, the rate of extrusion of said comminute and the time of shearing of said comminute being so related as to provide successive elements of desired size, followed by reunifying said elements so that there issues from the exit of each of said holes a coherent string of extrudate having spaced along its length lines of weakness resulting from said shearing and said reunifying of said elements;
    *iii*. heat-setting said coherent strings of extrudate at a temperature sufficient to prevent said heat-set strings from adhering to one another during subsequent mechanical working; and
    *iv*. mechanically working said heat-set strings of extrudate to break said strings at said lines of weakness to form granules or sticks thereof.

2. A method according to claim 1, wherein said fibres of set protein are fibres of cooked meat.

3. A method according to claim 1, wherein said fibres of set protein are spun protein fibres.

4. A method according to claim 1, wherein step (*iii*) is carried out by exposing said coherent strings of extrudate to humidified air at a temperature in the range of about 80° to about 150°C.

* * * * *